US006069933A

United States Patent [19]

Schultz

[11] Patent Number: 6,069,933

[45] Date of Patent: May 30, 2000

[54] METHOD FOR OPERATING A MEDICAL X-RAY MACHINE UTILIZING PLURAL X-RAY PULSES

[75] Inventor: Reiner-F Schultz, Dormitz, Germany

[73] Assignee: Siemens Aktiengesellschaft, Munich, Germany

[21] Appl. No.: 08/921,267

[22] Filed: Aug. 29, 1997

[30] Foreign Application Priority Data

Sep. 2, 1996 [DE] Germany .......................... 196 35 592

[51] Int. Cl.[7] ...................................... G01N 23/04

[52] U.S. Cl. ...................................... 378/62; 378/98.8

[58] Field of Search .............................. 378/62, 98.8, 106

[56] References Cited

U.S. PATENT DOCUMENTS 4,174,481 11/1979 Liebetruth .............................. 378/20
4,841,555 6/1989 Doi et al. .............................. 378/98.4
4,942,596 7/1990 Eberhard et al. ...................... 378/109
5,084,912 1/1992 Barr ...................................... 378/98.2
5,161,178 11/1992 Honda et al. ........................ 378/98.12
5,648,997 7/1997 Chao ..................................... 378/98.4

FOREIGN PATENT DOCUMENTS 0144369 8/1984 European Pat. Off. .

OTHER PUBLICATIONS

J. Haendle et al., "A New Electronic Tomographic System", *Electromedica* Feb. 1981, pp. 106–112.

*Primary Examiner*—David V. Bruce
*Attorney, Agent, or Firm*—Sughrue, Mion, Zinn, Macpeak & Seas, PLLC

[57] ABSTRACT

A method for operating a medical X-ray machine comprising a radiation source (2), a solid state radiation detector (6) having a pixel matrix, a control device (8) for controlling the operation, and a computer (7) for image formation, in which method, for the purpose of forming an image, X-ray radiation is emitted from the radiation source, fed to an object (5) to be radiographed, and received by the radiation detector. Subsequently, the image information is acquired and processed by means of the computer to compose an image to be displayed. The X-ray radiation is applied in the form of at least two separate X-ray pulses (11). The formation and/or composition of the image is based on the acquired image information, specific to the X-ray pulses, of at least a portion of the X-ray pulses.

28 Claims, 2 Drawing Sheets

METHOD FOR OPERATING A MEDICAL X-RAY MACHINE UTILIZING PLURAL X-RAY PULSES

The following disclosure is based on German Patent Application No. 19635592.3, filed on Sep. 2, 1996.

FIELD OF THE INVENTION

The invention relates to a method for operating a medical X-ray machine that includes a radiation source, a solid state radiation detector having a pixel matrix, and a computer used for image processing. In the method, for the purpose of forming an image, X-ray radiation is emitted from the radiation source, fed to an object to be radiographed, and received by the radiation detector. Subsequently, the image information is acquired and processed by means of the computer, to compose an image to be displayed.

DESCRIPTION OF THE BACKGROUND ART

Known systems for radiographic applications use mostly recording media in the form of X-ray films or storage foils. These films or foils are exposed to X-ray radiation for the purpose of forming a picture, and subsequently processed as appropriate to compose the image. The X-ray radiation is supplied in this case in the form of a single X-ray pulse with a duration of appropriate dimension. However, problems can arise, in particular with noncooperative patients, by virtue of the fact that the patient moves during the X-ray irradiation, whereby the resulting picture is unusable as a consequence of the "shaking". As a result, it is necessary to repeat the entire operation. Of course, these problems also arise when recording certain internal organs that move independently, for example, a lung or the heart.

A further problem associated with known X-ray systems is that the X-ray beam has to be faded in as accurately as possible in order to irradiate only as small a region as possible. Preferably, only essentially the region corresponding to the problem region to be examined is irradiated, in order thereby to minimize the area being irradiated. Accordingly, the structure to be examined, for example, a hand or the like, must be positioned correctly with respect to the X-ray machine so that the X-ray beam impinges at an optimum angle. If the structure to be examined is not correctly positioned, the image obtained is not informative, and it is necessary to take a repeat picture. Moreover, it is not necessarily straightforward to correctly position the structure to be examined, e.g., because internal organs and the like are not located in exactly the same position in each and every patient. Although external means, e.g., in the form of a light beam diaphragm, for facilitating correct positioning are known, it is sometimes are known impossible even with such means to achieve exact positioning.

OBJECTS OF THE INVENTION

It is therefore a first object of the invention to provide a method for operating a medical X-ray machine in a manner which largely overcomes the problems arising from movement of a structure to be examined. Another object is to provide a means by which the structure to be examined can be positioned in a way which is simple and more benign to the patient. Yet another object of the invention is to reduce the radiation exposure for the patient.

SUMMARY OF THE INVENTION

In order to achieve these and other objects, the invention provides a method of the type described above, in which the X-ray radiation is applied in the form of at least two separate X-ray pulses. The formation and/or composition of the image is based on acquired image information that is specific to the X-ray pulses and that stems from at least a portion of the X-ray pulses.

Thus, according to the invention, the X-ray radiation is no longer applied as a single pulse of long duration. Instead, the radiation is applied in the form of at least two or, if appropriate, more separate X-ray pulses. The X-ray pulses are selected to have a short temporal duration relative to the total time of application of the radiation, since the shorter the irradiation time within an X-ray pulse, the less problematical are any movements which occur. The image information generated as a result of the individual X-ray pulses and read out from the solid state radiation detector ("component image information") can thereafter be used in a variety of different ways during subsequent processing. On the one hand, it is possible to combine some or all the items of component image information that are specific to the individual X-ray pulses in the image composition process. In other words, the "component images" obtained from the plurality of X-ray pulses are combined with one another to compose an ultimate display image. This component image information can either be combined directly or, preferably, as described in greater detail below, be evaluated in terms of the specific image information content thereof, before or during the process of combination.

On the other hand, it is also possible, merely only to read out the component image information of, for example, one X-ray pulse, e.g., the initial one, from the radiation detector without necessarily using it thereafter to form display image information. The component image information obtained can be used subsequently, instead, to control the image formation operation. This can entail adjusting the image processing parameters in light of the component image information read out or even controlling the subsequent irradiation procedure itself as a function of the initially obtained image information. As a result, it is possible, according to this aspect of the invention, to determine, e.g., the position of the structure being examined after acquiring an initial or a previous set of component image information. Then, on the basis of this information, the X-ray machine can subsequently perform positional control, e.g., by correcting the relative position between the radiation source, detector and object being examined, if necessary. Other examples of parameters that can be adjusted in light of the component image information already processed are the duration of the exposure, the intervals between exposures, the voltage of the generator driving the radiation source, any of the various routines used for processing the image data, etc.

The method according to the invention consequently represents a particularly advantageous operational method which is completely comprehensive in its multi-functionality. As a consequence of its decomposing the exposure sequence into separate X-ray pulses, and the resultant creation of component image information, the X-ray machine is able to form images or compose images both based on this component image information and/or influenced by this compound image information. Among other advantages, the invention thereby avoids the problems associated with the related art discussed above.

According to a further aspect of the invention, in the process of composing the image, the individual groups of component image information of the respective applied X-ray pulses are combined with one another as a function of at least one selected piece of component image information.

It is thus advantageously possible, despite a given movement of the structure being examined, for the groups of component image information, or portions thereof, to be combined with one another, e.g., either in overlapping or displaced fashion, to provide composite display image information for providing an image of the structure being examined. In other words, the invention, in effect, allows component images corresponding to the individual X-ray pulses, which can be displayed as independent images, to be combined correctly to form at least one high quality display image. Preferably, the combining of component image information is achieved by selecting a part of the information present in two or more, perhaps even each, component images. This could be, e.g., an appropriate part of the structure being examined or else an appropriate marking. This selected information is then superimposed, with the result that all independent items of image information are appropriately aligned with one another. A pixel-shift operation, whereby, in effect, the individual component images are compared with and shifted relative to one another to establish a matching overlap, is one method that can be used to carry out the alignment and superposition procedure. It is thereby possible, according to the invention, to compose an image that is essentially free from movement artifacts.

According to another aspect of the invention, the position of the radiation source and/or the radiation detector is varied between the X-ray pulses for the purpose of permitting tomography. It is therefore advantageously possible, given an appropriate change in the position of the components of the machine, to make tomographs which are assembled and processed by the computer to form component images from the received items of image information. As a result, 3-D tomographs, for example, can be formed or 3-D structures can be reconstructed, with particular advantage. In this case, there are no limits to the type of movement of the components of the machine, with the result that any type of tomograph can be realized.

According to yet another aspect of the invention, the spectral composition and/or dose of the X-ray radiation specific to the X-ray pulses can be varied, for example, by increasing or otherwise adjusting the operating voltage for the radiation source from X-ray pulse to X-ray pulse. Such a mode of operation supplies X-ray quanta of different quality to the object being examined. That is advantageous, inter alia, in that different objects, e.g., different organs, absorb the applied radiation differently, and it is possible to better detect and/or differentiate organs with the aid of the various absorption characteristics. Advantageously, it is possible to undertake an even more precise differentiation of objects than previously known, by means of the possible multiplicity of X-ray pulses that can be applied within an examination, and the possibility thereby provided of applying many different "radiation qualities".

Whenever, e.g., the first applied X-ray pulse is used to take a preliminary picture, e.g., for determining the position, the area to be exposed, etc., it has proven to be expedient if its dose is smaller than that of the subsequent X-ray pulse or pulses, in order to keep the radiation burden as light as possible. For example, the dosage of the preliminary exposure can be 1/100th of the dosage of the main exposure. Further, the main exposure, according to the invention, can itself consist of a plurality of component exposures, each of which represents a dosage that is a corresponding fraction of the overall dosage for the entire exposure sequence.

The invention further provides that the X-ray transparency of the radiographed object can be determined on the basis of the image information of at least one, preferably the first, X-ray pulse. On the basis of the transparency value determined, parameters specific to the picture are determined, and these parameters, in turn, are used to control the radiation source, in particular. As a result, the X-ray machine is able to select the optimal radiation dose for the main exposure, or for subsequent exposure pulses, as the case may be, on the basis of the parameters determined. Since the matrix radiation detector thereby functions rather like a dose meter, it is possible to eliminate certain measuring elements previously used in the prior art, such as a dose measuring chamber or the like.

A further advantage is that when, for example, the segments of the image selected for the initial pulse are not adjusted or positioned exactly, they can still be appropriately readjusted after the first X-ray pulse has been emitted and the preliminary picture has been obtained. As a result, the patient is spared being exposed needlessly to a full dose of radiation for an image that turns out to be unusable. In other words, spurious, full-dosage exposures are avoided. Furthermore, following repositioning of the structure to be examined, a second X-ray pulse with a correspondingly low dose can be applied instead of already applying the high-dose pulse.

Also, the first X-ray pulse is not necessarily wasted even if the positioning was incorrect, because, as described above, the first X-ray pulse can most likely nonetheless be used for determining other imaging parameters, e.g. the correct radiation dose. This has the advantage that it is possible to determine the needed dose exactly and thus to determine the most appropriate settings for the control parameters in a procedure that nonetheless is benign to the patient.

Furthermore, the invention allows for the component image information, which can be displayed as an independent image, and/or the mutually combined image information, to be processed with regard to noise suppression. This can be performed, for example, by an appropriate smoothing operation. Another possibility for suppressing noise, and also enhancing the data output speed of the radiation detector is to read out signals from a plurality of pixels in combination, also known as "binning".

The items of image information can be added to or subtracted from one another in the process of combining these items of image information, as a function of the type of examination method being carried out, or of the desired image to be obtained. Thus, some or all of the component images can be overlayed through addition of their respective, corresponding pixel values to form a resultant image. Further images can be formed by subtracting certain of the component images, e.g., to enhance or suppress certain image features.

In addition to the method according to the invention, the invention further relates to a medical X-ray machine capable of carrying out the above-described method. The machine includes a radiation source which emits X-ray radiation, a solid state radiation detector which receives the radiation and which is configured as a pixel matrix, a computer for composing an image to be displayed on the basis of image information read out from the radiation detector, and a control device controlling the operation of at least the radiation source. This medical X-ray machine is distinguished according to the invention in that the control device generates the X-ray radiation to be emitted in the form of at least two X-ray pulses. Additionally, the computer of the X-ray machine composes one or more images, which can be displayed, on the basis of respective groups of component image information, each group of which is specific to each X-ray pulse and can be read out from the radiation detector.

Thus, the control device advantageously permits the generation, in an appropriate single-pulse form, of X-ray beams which are applied to the object being examined. It is subsequently possible to use the computer to compose one or more images which depend for their content on the groups of component image information specific to the X-ray pulses. The computer is designed both for forming a total image, assembled from the component images specific to the X-ray pulses, and for outputting individual X-ray pulse images such as, for example, the preliminary picture, based on the first applied X-ray pulse. From this preliminary picture, it is possible for instance, to obtain corresponding information which subsequently serves for further control or positioning.

According to the invention, the control device is designed for generating X-ray pulses which are short in relation to the total duration of the radiation application. As a result, sufficiently short radiation exposures, corresponding to component images which largely suppress any movement artifacts can be obtained. In addition, for the purpose of forming tomographs, the position of the radiation source and/or of the radiation detector can be varied from X-ray pulse to X-ray pulse. Accordingly, the computer is designed to combine the positionally differing items of image information, which are specific to the individual X-ray pulses.

In order to permit component images to be superimposed as a function of the object being examined or a segment thereof, the computer is designed to combine two or more groups of component image information (component images) as a function of at least one selected information component (image component). It is thereby possible for the component images to be superimposed in accordance with appropriately coordinated positions, and or them to be assembled to form a total image. This superposition of appropriately shifted and realigned component images provides a unique and highly effective means for compensating any possible object movements.

Furthermore, the control device is capable of generating X-ray pulses which vary in their spectral composition and/or dose, e.g., in order to be able to undertake investigations which are spectrally specific.

With regard to controlling the device in a fashion responsive to the actual case-by-case conditions while at the same time minimizing the radiation burden on the patient and also ensuring optimum image formation, the X-ray machine further includes a means for determining the transparency of the radiographed object. In particular, the means, which can be incorporated into the computer, analyzes the image information of at least one, preferably the first, X-ray pulse. This determining means then controls the control device to carry out the recording operation as a function of picture-specific parameters that are selected on the basis of the transparency value determined.

In order to suppress image noise, which becomes noticeable, in particular, due to quantum noise at low doses, the invention provides for the computer to carry out noise suppression processing. The noise suppression an be performed either on the component image information, e.g. prior to being displayed as an independent image or prior to being combined with other such items of component image information, or on the composite image information prior to being displayed as an image.

Furthermore, the computer can be designed to combine the items of image information additively or subtractively, as a function of the selected type of examination or of the desired image to be output. In addition, in order to permit operation which is as fast as possible and an image output which corresponds as far as possible to the actual conditions, the computer may be implemented to compose images that can be displayed essentially in real time.

BRIEF DESCRIPTION OF THE DRAWINGS

Further advantages, features and details of the invention emerge from the following description of exemplary embodiments, as well as with the aid of the drawings, in which.

DETAILED DESCRIPTION OF THE PREFERRED EMBODIMENTS

Figure 1:
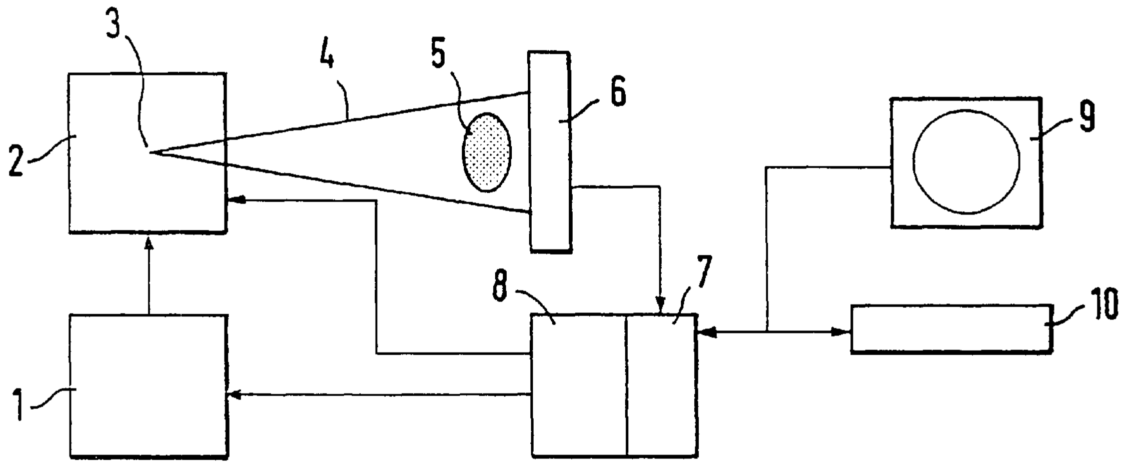
FIG. 1 shows a schematic sketch of an X-ray machine according to the invention.

FIG. 1 shows, in the form of a schematic sketch, the most important components of an X-ray machine according to the invention. The X-ray machine has a high-voltage generator 1 which serves to generate the X-ray radiation 4 emitted by the radiation source 2 in the focal spot 3. The emitted X-ray radiation 4 is fed to an object 5 to be examined, and thereafter strikes a solid state radiation detector 6. The detector 6, which is arranged behind the object, has a pixel matrix and receives the X-ray radiation, which is converted in the detector 6 into corresponding radiation-induced image information. This image information is read out from the detector 6 by a device, which in the present embodiment is a combined unit comprising a computer 7 and a control device 8. The computer 7 serves to compose the image, which can subsequently be displayed on a monitor 9. Additionally, an operating unit 10 is provided for appropriately operating the above-described components. As shown, the control device 8 communicates with the high-voltage generator 1, with the result that it is possible to exercise appropriate control over the X-ray radiation generated thereby.

Figure 2:
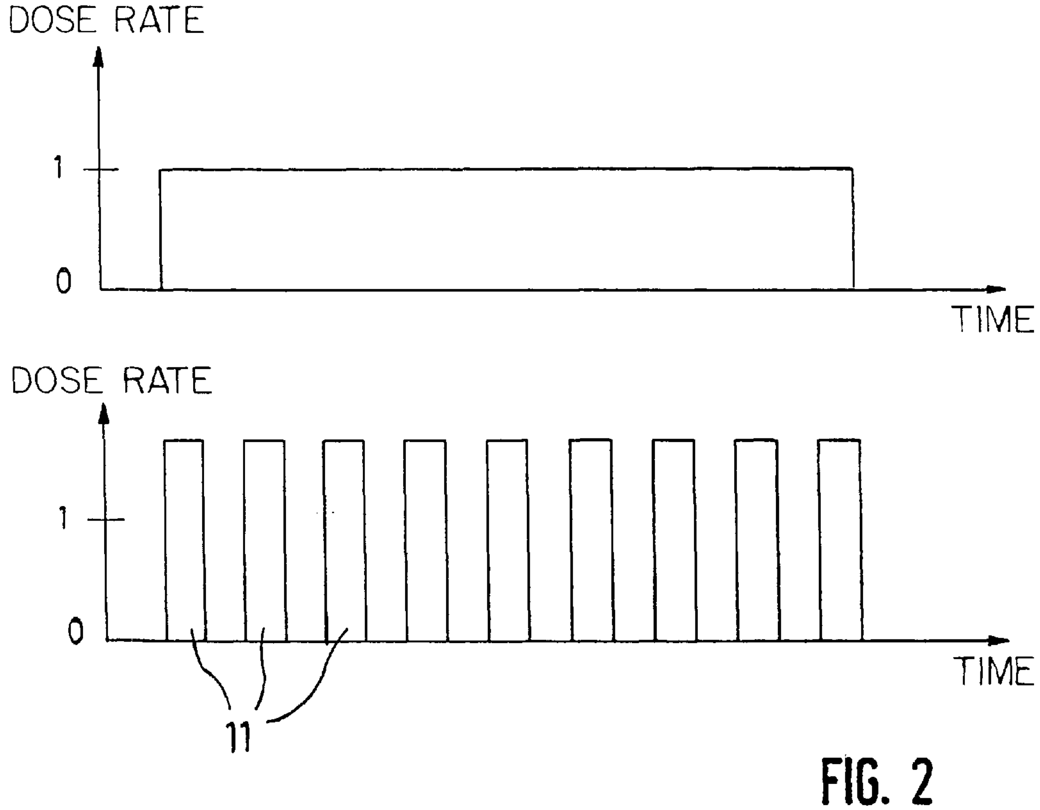
FIG. 2 shows two diagrams which reproduce the temporal radiation exposure sequence in accordance with the background art and in accordance with the invention.

In the upper diagram, FIG. 2 shows the temporal characteristic of the X-ray radiation applied in accordance with the background art. It may be seen that this radiation is applied in the form of a single X-ray pulse, which leads to the disadvantages described at the background discussion, in particular with regard to object movement and corresponding object positioning.

The lower graph, by contrast, shows how the X-ray radiation is applied according to the invention in the form of individual X-ray pulses. As may be seen, the X-ray radiation is applied in the form of a multiplicity of individual X-ray pulses 11 which are generated sequentially in a clocked fashion. The duration of each individual X-ray pulse 11 is substantially shorter than the total duration of the radiation application. This has the result that, due to the shortness of the radiation application, corresponding movement artifacts are of negligible importance, even when they occur at the instant of applying the pulse. In the exemplary embodiment shown, the dose rate plotted along the ordinate is somewhat higher in the case of the clocked X-ray pulses than the dose rate as selected in the case of the single X-ray pulse in accordance with the related art. The dose rate can, however, also be of a correspondingly lower dimension, depending on the type of examination. It is also possible to vary the dose rate from X-ray pulse to X-ray pulse.

At the radiation detector 6, each X-ray pulse 11 supplies an independent group of image information which is read out as appropriate by means of the computer 7 and subsequently processed depending on the type of examination or output image desired. For example, all the separate groups of component image information, corresponding to the respective pulses 11, can be superimposed to form a total image (in effect by superimposing component images). It is also possible, moreover, to consider individual X-ray pulses separately in their component images, that is to say, for example, the first X-ray pulse, in order in this way to determine the correct positioning of the object to be examined or some other relevant parameter(s). Such other parameters might include, for example, object transparency, dosage, spectral characteristics, number of exposures, generator voltage and any other such control parameters.

Figure 3:
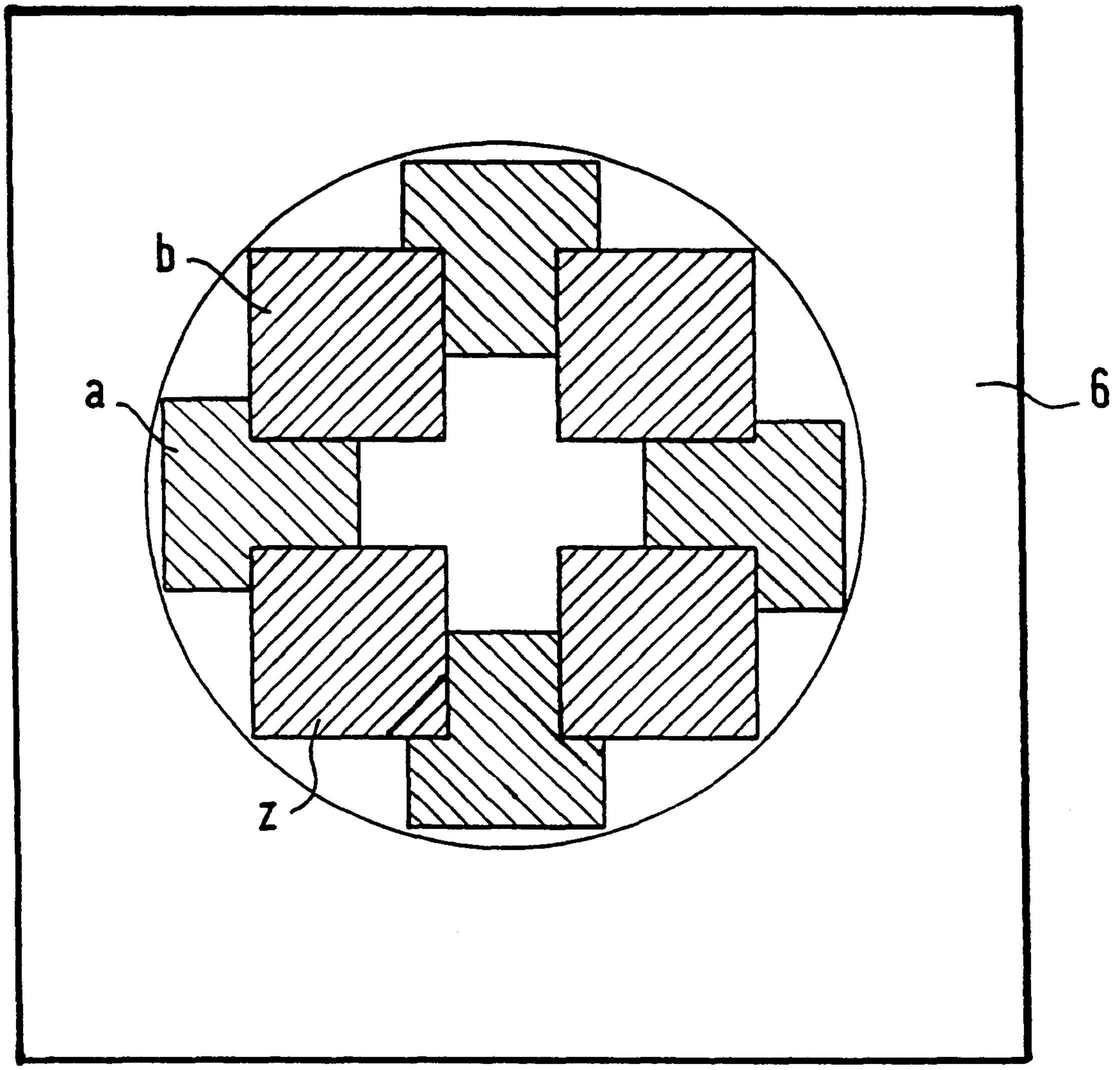
FIG. 3 shows a schematic sketch for the formation of a tomograph, the total image of which is assembled from a plurality of component images.

Finally, FIG. 3 shows by way of an example, a process for forming a tomograph. Tomosynthetic methods, in general, are known in the art, see, e.g., U.S. Pat. No. 5,359,637 to Webber and references cited therein. The radiation detector 6 is shown. Component images a, b, . . . z in different positions are represented on it. These component images are obtained by varying the position of the radiation source and/or the radiation detector between the individual applied X-ray pulses. That is to say, the effectively exposed area on the radiation detector is displaced from X-ray pulse to X-ray pulse, a different detector region thus being exposed in each case. If the radiation detector is not of the appropriate size, the component images are formed correspondingly at the same position. Each component image is read out by means of the computer 7 and processed to form a total image. In this way, it is possible to obtain 3-D tomographs by appropriate processing, or to reconstruct 3-D structures. Any movement both of the radiation source and of the radiation detector is possible in the course of forming a tomograph from digitally processed component images. For example, the movable radiation source, which is usually arranged on the ceiling of the examination room, can be moved linearly; a spiral movement is likewise also possible. Depending on its design, the radiation detector can remain unmoved, or else can be moved in a corresponding fashion to the radiation source, e.g. by being mechanically coupled with the radiation source.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A method for operating a medical X-ray machine including a radiation source, a solid state radiation detector having a pixel matrix, and a computer, said method comprising:

emitting X-ray radiation as at least two separate X-ray pulses from the radiation source and directing the X-ray pulses through an object being radiographed;

receiving the emitted and directed X-ray pulses by means of the radiation detector and converting each of the received X-ray pulses into a respective group of component image information capable of being processed into an independent image; and processing the groups of component image information by means of the computer into display image information, the display image information being based on at least a portion of the received X-ray pulses and representing a composite image of at least a portion of the object being radiographed, wherein said processing step comprises:

selecting at least one piece of the component image information;

linking the respective groups of component image information in accordance with the selected piece of information; and composing the display image information in accordance with the linked groups of component image information.

2. The method as claimed in claim 1:

wherein the selected piece of information is common to at least two of the groups of component image information.

3. The method as claimed in claim 1:

wherein the X-ray pulses have a short temporal duration relative to a temporal duration of said emitting step overall.

4. The method as claimed in claim 1, further comprising the step of changing a position of at least one of the radiation source and the radiation detector between emitting a first one and a second one of the X-ray pulses;

wherein said composing step comprises composing tomographic display image information representing a composite tomographic image.

5. The method as claimed in claim 1, further comprising the step of changing at least one of an energy content and a dose content of the X-ray radiation from a first one to a second one of the X-ray pulses.

6. The method as claimed in claim 5, wherein the dose content of the first X-ray pulse is smaller than the dose content of the second X-ray pulse.

7. The method as claimed in claim 1, wherein:

the medical X-ray machine further includes a control device for controlling operation of at least the radiation source;

said step of processing the group of component image information associated with a first X-ray pulse further comprises:

evaluating the group of component image information associated with the first X-ray pulse, to produce an evaluation result; and said method further comprises:

controlling the radiation source by means of the control device in accordance with the evaluation result.

8. The method as claimed in claim 7, wherein the first X-ray pulse is an initial X-ray pulse of said emitting step.

9. The method as claimed in claim 7, wherein:

said evaluating step comprises:

determining a transparency of the radiographed object on the basis of the group of component image information associated with the first X-ray pulse; and said step of controlling the radiation source comprises:

controlling the radiation source by means of the control device in accordance with the transparency determined for the radiographed object.

10. The method as claimed in claim 7, wherein:

said step of controlling the radiation source comprises: adjusting a position of the radiation source by means of the control device in accordance with the evaluation result.

11. The method as claimed in claim 7, wherein:

said step of controlling the radiation source comprises: adjusting an orientation of the X-ray radiation emitted by the radiation source by means of the control device in accordance with the evaluation result.

12. The method as claimed in claim 7, wherein:

said step of controlling the radiation source comprises: adjusting a dose rate of the X-ray radiation emitted by the radiation source by means of the control device in accordance with the evaluation result.

13. The method as claimed in claim 7, wherein:

said step of controlling the radiation source comprises: adjusting a spectral composition of the X-ray radiation emitted by the radiation source by means of the control device in accordance with the evaluation result.

14. The method as claimed in claim 1, wherein said processing step further comprises: performing noise-suppression processing of the respective groups the image information capable of being processed into respective independent images.

15. The method as claimed in claim 1, wherein said processing step further comprises: performing noise-suppression processing of the display image information composed in accordance with the linked groups of component image information.

16. The method as claimed in claim 1, wherein said processing step further comprises: subjecting the respective groups of component images information to at least one of additive or subtractive processing.

17. A medical X-ray machine, comprising:

a radiation source for emitting X-ray radiation;

a solid state radiation detector having a pixel matrix, for receiving the X-ray radiation and outputting image information in accordance with the X-ray radiation received;

a computer for composing an image for display on the basis of the image information output from said radiation detector; and a control device for controlling said radiation source to generate the X-ray radiation in the form of at least two distinct X-ray pulses;

wherein said radiation detector is arranged to output a distinct group of component image information for each of the X-ray pulses, each of the groups of component image information corresponding to a component image capable of being displayed as an independent image; and wherein said computer is arranged to select an information component and to link at least portions of at least two of the groups of component image information as a function of the information component selected, for the purpose of composing the image for display.

18. The medical X-ray machine as claimed in claim 17, wherein the X-ray pulses generated by said control device are short in relation to a total duration of the X-ray radiation.

19. The medical X-ray machine as claimed in claim 17, further comprising:

means for varying a position of at least one of said radiation source and said radiation detector between the at least two X-ray pulses;

wherein said computer is arranged to link at least the portions of the at least two groups of component image information, for forming a tomograph.

20. The medical X-ray machine as claimed in claim 17, wherein said control device is arranged to control said X-ray source to generate the X-ray pulses as pulses varying in relative spectral composition.

21. The medical X-ray machine as claimed in claim 17, wherein said control device is arranged to control said X-ray source to generate the X-ray pulses as pulses varying in relative radiation dose.

22. The medical X-ray machine as claimed in claim 17, wherein said computer is arranged to determine a transparency of an object being radiographed on the basis of the group of component image information corresponding to an early one of the X-ray pulses, and to output specific parameters to said control device in accordance with the transparency determined; and wherein said control device controls at least one radiation parameter of a later one of the X-ray pulses generated by said X-ray source in accordance with the specific parameters input from said computer.

23. The medical X-ray machine as claimed in claim 22, wherein the early X-ray pulse is an initial X-ray pulse generated by said X-ray source.

24. The medical X-ray machine as claimed in claim 17, wherein said computer is arranged to suppress noise in the groups of component image information.

25. The medical X-ray machine as claimed in claim 17, wherein said computer is arranged to suppress noise in the image for display.

26. The medical X-ray machine as claimed in claim 17, wherein said computer is arranged to link at least the portions of the at least two groups of component image information through additive processing.

27. The medical X-ray machine as claimed in claim 17, wherein said computer is arranged to link at least the portions of the at least two groups of component image information through subtractive processing.

28. The medical X-ray machine as claimed in claim 17, wherein said computer operates essentially in real time.

* * * * *